US008412565B2

(12) United States Patent
Müller

(10) Patent No.: US 8,412,565 B2
(45) Date of Patent: Apr. 2, 2013

(54) APPARATUS, METHOD AND PROGRAM FOR FORMULATING AND SOLVING PROBLEMS OVER A NETWORK

(76) Inventor: Michael A. Müller, Berlin (DE)

( * ) Notice: Subject to any disclaimer, the term of this patent is extended or adjusted under 35 U.S.C. 154(b) by 2447 days.

(21) Appl. No.: 09/810,395

(22) Filed: Mar. 19, 2001

(65) Prior Publication Data
US 2002/0029167 A1 Mar. 7, 2002

(30) Foreign Application Priority Data

Sep. 4, 2000 (EP) .................................. 00119125
Sep. 15, 2000 (EP) .................................. 00120302

(51) Int. Cl.
G06Q 30/00 (2012.01)
G06Q 10/00 (2012.01)
(52) U.S. Cl. ....................................... 705/14.1; 705/300
(58) Field of Classification Search .................. 705/10, 705/14, 14.1, 300
See application file for complete search history.

(56) References Cited

U.S. PATENT DOCUMENTS

| | | | | |
|---|---|---|---|---|
| 5,862,223 | A | 1/1999 | Walker et al. | 380/25 |
| 5,948,054 | A | 9/1999 | Nielsen | 709/200 |
| 6,026,148 | A | 2/2000 | Dworkin et al. | 379/88.18 |
| 6,028,601 | A | 2/2000 | Machiraju et al. | 345/336 |
| 6,064,978 | A * | 5/2000 | Gardner et al. | 705/10 |
| 6,223,165 | B1 * | 4/2001 | Lauffer | 705/8 |
| 6,275,811 | B1 * | 8/2001 | Ginn | 705/10 |
| 6,505,166 | B1 * | 1/2003 | Stephanou | 705/8 |
| 6,694,355 | B1 * | 2/2004 | Bahar | 709/217 |
| 7,155,157 | B2 * | 12/2006 | Kaplan | 434/350 |
| 2001/0056374 | A1 * | 12/2001 | Joao | 705/14 |
| 2002/0076674 | A1 * | 6/2002 | Kaplan | 434/107 |
| 2006/0173702 | A1 * | 8/2006 | Saxena et al. | 705/1 |

OTHER PUBLICATIONS

Introduction to the CESDIS Beowulf; Beowulf Introduction & Overview, Nov. 9, 1998.*
Defense Taps 2 Finalists for Jet Contract; Military: Boeing and Lockheed Martin will build prototype of fighter. McDonnell Douglas loses out but Southland will bet a piece of the project; Robert A Rosenblatt, et al. Los Angeles Times, Nov. 17, 1996.*
Experts Exchange How-To; "How Experts Exchange® Works"; http://web.archive.org/web/19970421001341/www.experts-xchange.com/info/howto.html.*
About Experts Exchange TM (http://web.archive.org/web/19971110001525/www.experts-exchange.com/info/geninfo.htm.*
How to Become an Expert http://web.archive.org/web/19970421014217/www.experts-exchange.com/info/expert.htm.*
Experts Exchange for Intranets http://web.archive.org/web/19971110021954/www.experts-exchange.com/info/intranet.htm.*
The Knowledge Community http://web.archive.org/web/19971110015159/www.experts-exchange.com/info/community.htm.*
Experts Exchange: Gold site! http://web.archive.org/web/19971110014952/www.experts-exchange.com/info/gold.htm.*
Experts Exchange: Registering as an Expert; How to Become an Expert. http://web.archive.org/web/19970421014217/www.experts-exchange.com/info/expert.htm2.*
World Wide Web page, http://www.expertcentral.com (Jun. 5, 2001).
World Wide Web page, http://www.handtech.com (Jun. 5, 2001).

* cited by examiner

Primary Examiner — Yehdega Retta
(74) Attorney, Agent, or Firm — Fitzpatrick, Cella, Harper & Scinto

(57) ABSTRACT

In an apparatus, method and computer memory for interactive problem solving on a network, a server receives from a first participant via the network a formulation of a problem to be solved. The server receives from other participants via the network suggested solutions to the problem, and distributes portions of an award to those participants who contribute suggested solutions to the problem.

53 Claims, 13 Drawing Sheets

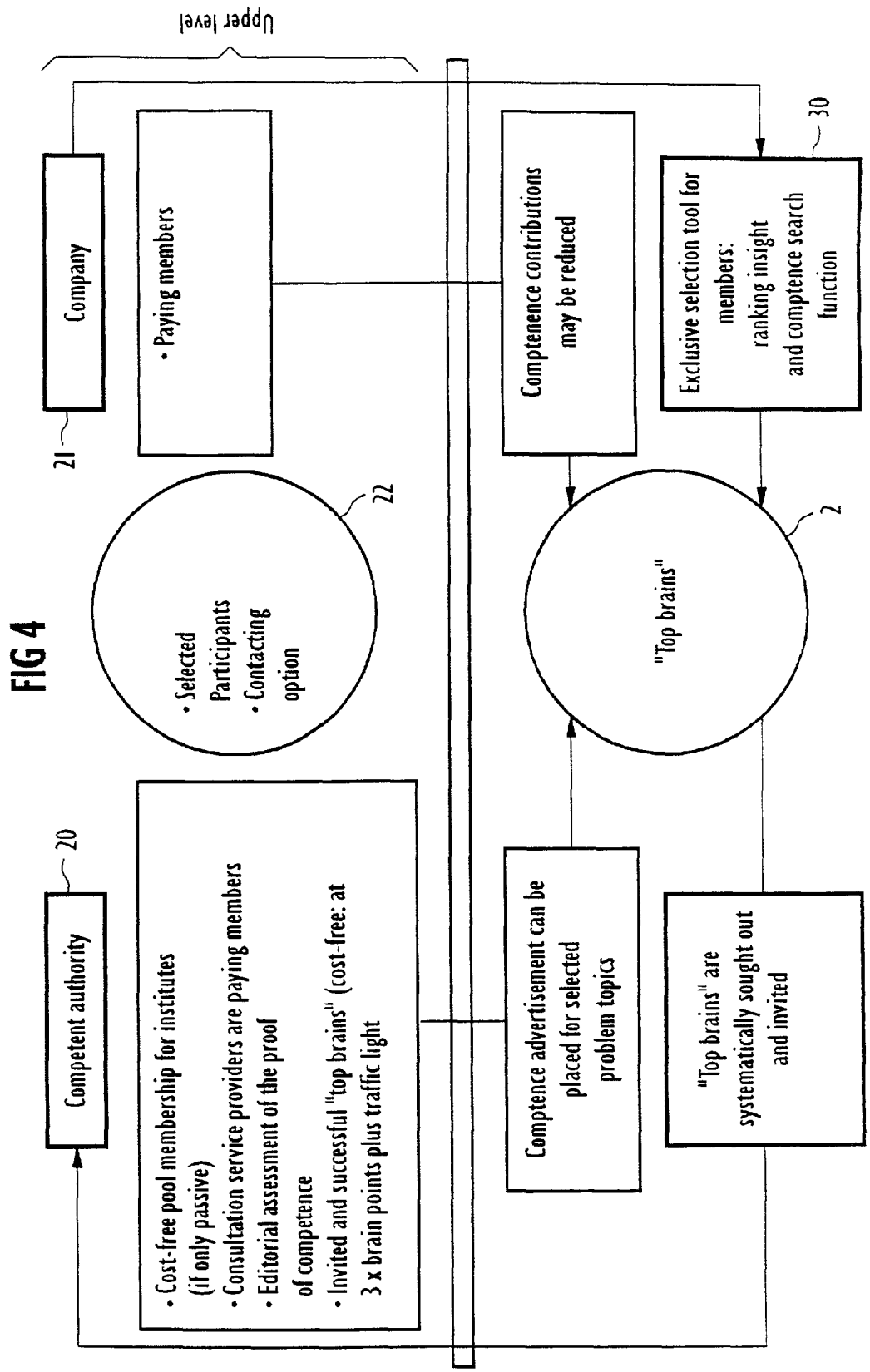

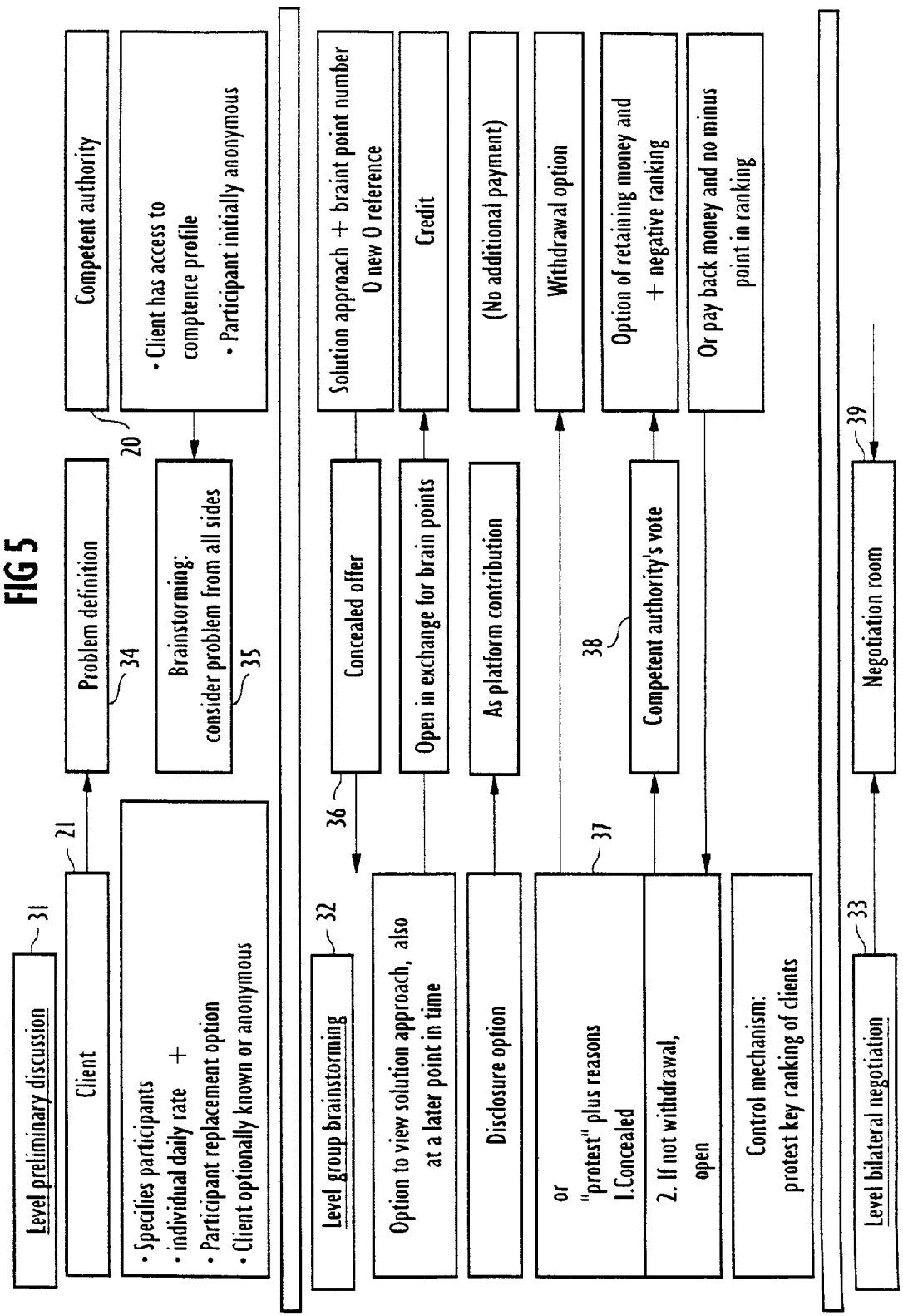

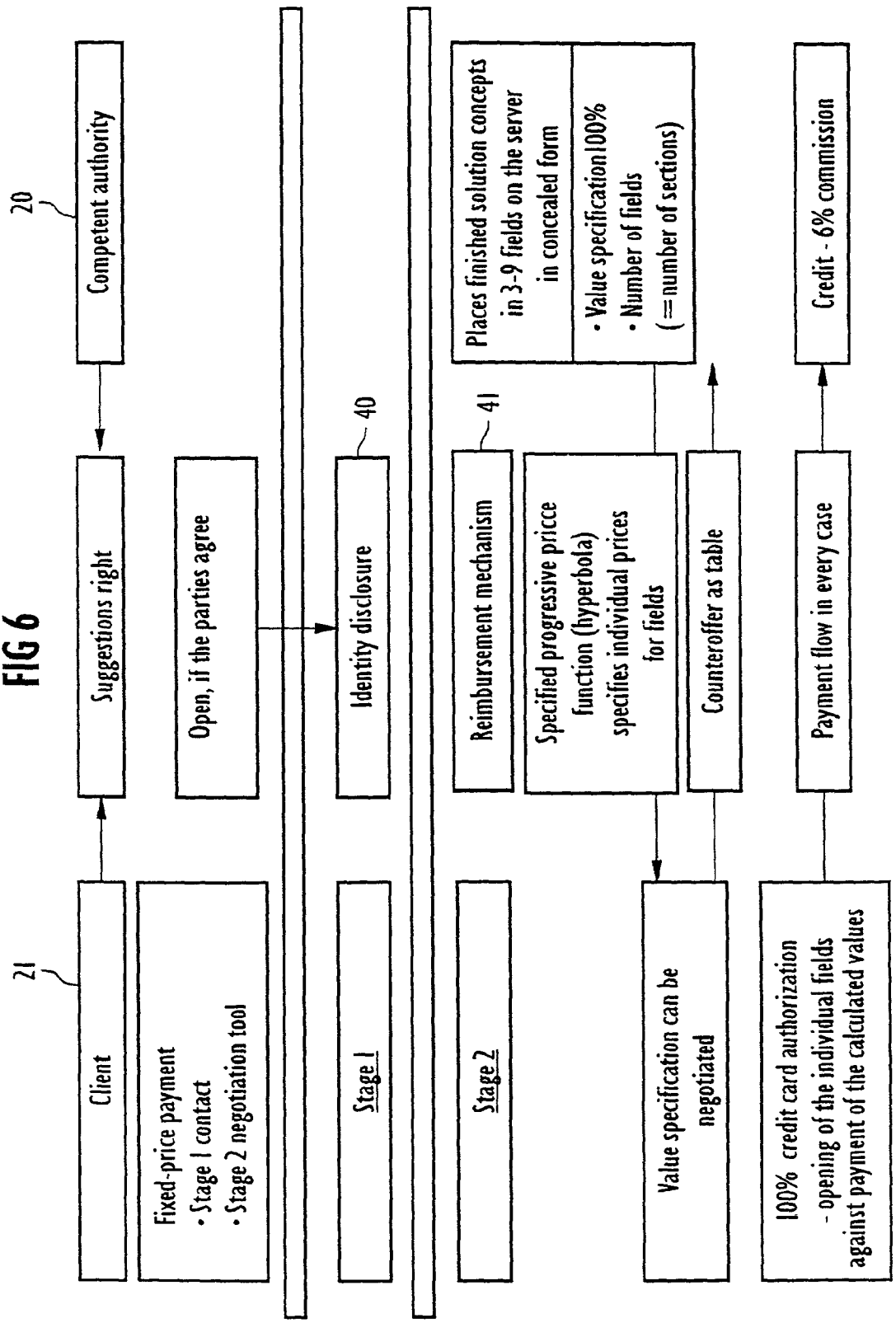

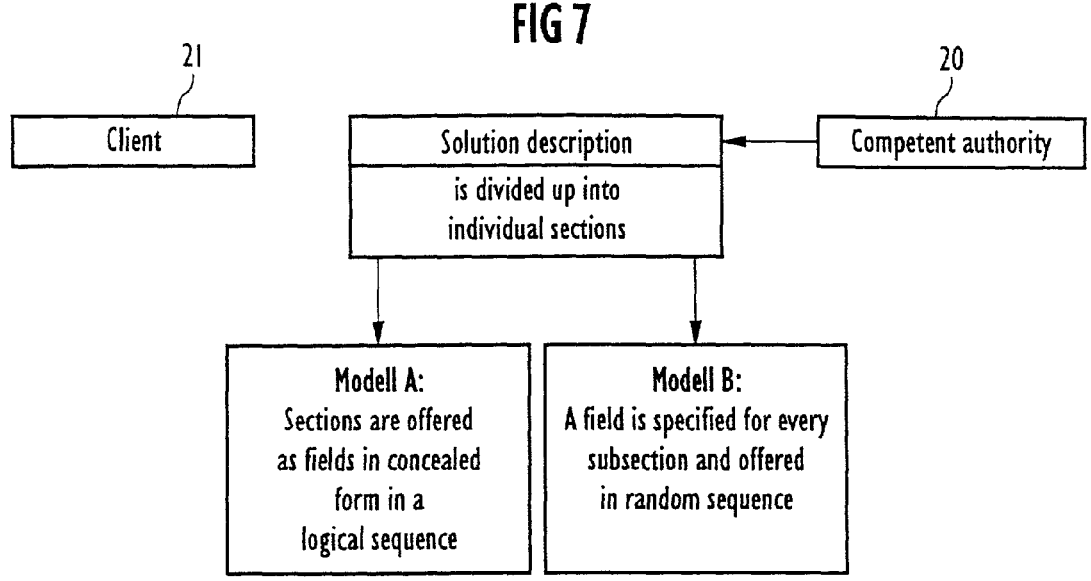
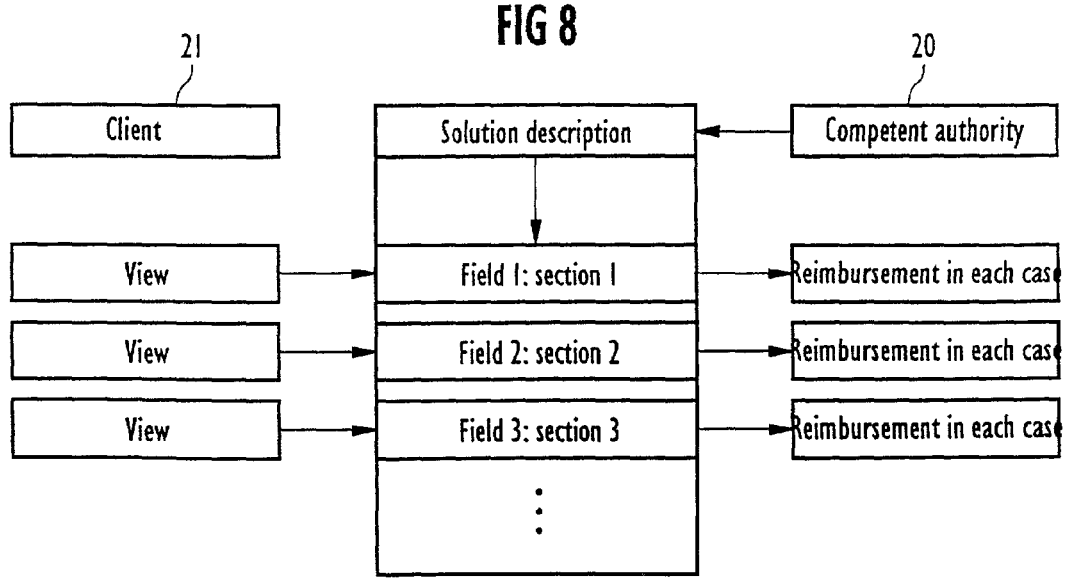

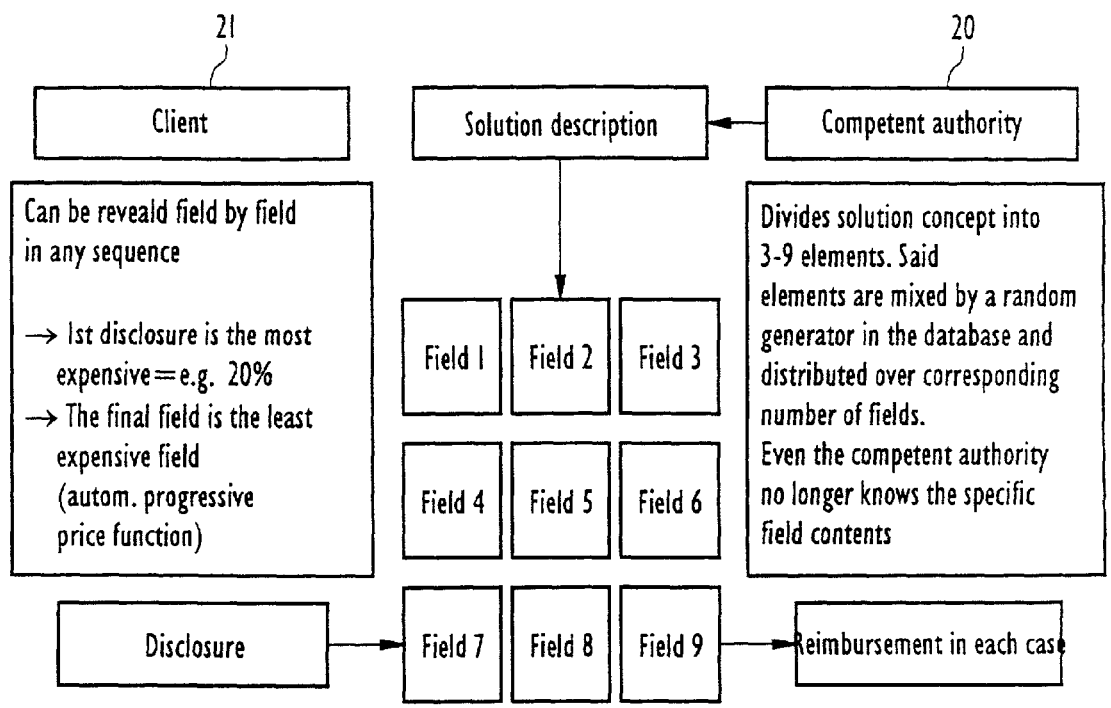

APPARATUS, METHOD AND PROGRAM FOR FORMULATING AND SOLVING PROBLEMS OVER A NETWORK

BACKGROUND OF THE INVENTION

1. Field of the Invention

The present invention relates to a method for interactive problem solving via a data network, to a software program for performing such a method and to a web server that has such a software program. Furthermore, the present invention relates to a problem-solving database that is built up by means of such a method as mentioned.

2. Related Art

The central idea of the Internet, namely to interconnect participants who are disposed decentrally, is suitable for the field of brainstorming/problem solving. Accordingly, it is also already known from the prior art to provide a platform by means of which the problem formulator can input questions or problems and the idea provider can input contributions or suggested solutions. In this context, therefore, platform is understood as meaning a communication and visualization program that is implemented on a central computer of a data network, for example the Internet, and on which any participants or selected participants of the communication can communicate via the data network.

More strictly speaking, it is known from the prior art that a problem formulator inputs a question into the platform. This means that he registers with the platform and then inputs his problem in text form in a so-called forum. He then has to hope that competent idea providers or, in particular, motivated idea providers are found who input applicable suggested solutions or answers. In the ideal case, consequently, recourse may be made for the purpose of solving problems to the worldwide knowledge organized decentrally by the potential participants.

In the meantime it has emerged that, in particular, competent idea providers do not give their contributions to the questions posed by the problem formulator without further ado. It is therefore known from the prior art that the problem formulator offers for motivation reasons a fixed prize as an incentive. The problem formulator therefore promises the idea provider who finds a complete solution a fixed amount of money.

This results in the problem that the amount of money may never be paid out since, according to the assessment of the problem formulator, none of the idea providers has given a complete or adequately competent answer. In addition, such an offering of a standard prize is suitable only for problem formulations that can actually be solved in one go. The problem formulator is otherwise faced with the dilemma of either awarding the complete amount for an unsatisfactory answer or, alternatively, not awarding the prize at all for a case and consequently demotivating all the potential participants.

The motivation problem for iterative solution processes in which, therefore, a complete or competent solution is worked out in several steps or, possibly, with a multiplicity of branchings, therefore continues to exist in the prior art. At the same time, it has to be remembered that said iterative solution process comes appreciably closer to the reality of brainstorming-like events.

SUMMARY OF THE INVENTION

It is therefore the object of the present invention to provide a technique that makes possible problem solving via a data network, it being intended to design said technique to support the natural iterative solution process in a plurality of steps by commensurate motivation of idea providers.

This object is achieved, according to the invention, by the features of the independent claims. The dependent claims develop the central idea of the invention in a particularly advantageous manner.

According to the invention, a method of interactive problem solving via a data network, in particular the Internet, is provided. In this method, a first participant (problem formulator) inputs a problem formulation into the data network. Other participants, whose number is specified or, alternatively, also unlimited, input suggested solutions. To support the natural iterative solution process by commensurate motivation, control tools are available to the first participant, the problem formulator. The term "tool" in this context denotes, for example, complete program units that are stored on the central problem solution platform and that each perform a predetermined function. The first participant, the problem formulator, may use said control tools to perform a targeted individual awarding of motivation points or a targeted individual awarding of a prize to the other participants. The awarding of motivation points or the awarding of a prize may in this connection be varied in the course of the development of the suggested solutions by the problem formulator, the first participant, in relation to the other participants for the purpose of guiding the development of the problem solution.

The present invention consequently departs from the principle of the fixed awarding of the total prize sum and, on the contrary, permits a systematic section-by-section awarding in order to keep the motivation potential high during the entire, possibly iterative, problem-solving process.

The first participant can specify at the outset a fixed prize that is divided up in the course of the problem solving in respect of time of allocation and addressee, but must at all events be paid out.

In addition, the other participants, that is to say the idea providers, may mutually award themselves a part of the award.

As stated, both the input of the problem formulation and of the suggested solutions, including the provision of the control tools can take place via a central data network platform that is stored in a server of the data network (Internet).

The suggested solutions can be inputted in real time and displayed on the data network platform. The input of the problem formulation and the suggested solutions may, at the same time, be done anonymously.

The control tools may, at the same time, have a function in awarding an installment of the prize to another participant. Furthermore, the control tools may have a function in controlling the problem solving according to a selected suggested solution, in which case, therefore, the subsequent problem solving can develop further only within the context of said selected suggested solution.

In accordance with a further control tool, a function is provided for blocking the further development of a suggested solution so that the further development of the problem solving can no longer take place, at least temporarily, in the context of the blocked suggested solution.

In accordance with a further aspect of the invention, a software program is provided that, when loaded into a memory of a computer of a data network or implemented, makes it possible for connected participants of the data network to perform a method as explained above.

Furthermore, a web server is provided with such a software program.

In accordance with a further aspect of the invention, a system for interactive problem solving via a data network is provided in which a first participant inputs a question formulation or a problem formulation into the data network.

Other participants input answers or suggested solutions, control tools that make possible a targeted individual awarding of motivation points or awarding of a prize to the other participants being available to a presenter. At the same time, the awarding of motivation points or the awarding of a prize may be varied in the course of the development of the suggested solutions or answers by the presenter or the other participants to control the development of the problem solving.

The presenter may be chosen by the first participant and/or by the other participants. Optionally, only the presenter can specify at the outset a fixed prize that is divided up flexibly in the course of the problem solving.

The number of other participants may be limited, which is, for example, the case if the data network is an internal company Intranet. The input of the problem solving and the suggested solutions and also the provision of the control tools may take place via a central data network platform.

In accordance with a further aspect, a software program is provided for performing such a method. In accordance with yet a further aspect, the use of such a method is provided in a continuous improvement process of a company.

In accordance with yet a further aspect of the present invention, a method is provided for interactive problem solving via a data network, the problem formulation being performed by a client and the problem solving by a competent authority. In this connection, a competent authority is selected publicly via the data network in a first step from a multiplicity of anonymous competent authorities on the basis of preliminary suggested solutions that the competent authorities issue via the data network. The concluding solution of the formulated problem then takes place in private collaboration between an identified, selected competent authority and the client.

The competent authorities can be selected in this connection via the central data network platform. The competent authorities may be chosen in advance.

In accordance with yet a further aspect of the present invention, a method of interactive problem solving via a data network is provided in which a first participant inputs a question formulation or problem formulation into the data network, for example to a central problem-solving platform. Other participants provide answers or suggested solutions, the problem being described on-line by means of a graphical display on a data network platform on a central computer of the data network. The graphical display of the problem description can ideally be viewed on-line by all the other participants. As a simpler solution, provision may be made that the participant works with the last updated version of the graphical display, which is transmitted to the central platform only by operating a certain switching button.

In this connection, the graphical display may take place on the central computer without active or passive downloading.

In accordance with yet a further aspect of the present invention, a problem solution database is provided that contains ideas, problem formulations and suggested solutions that were inputted into a central data network platform in accordance with one of the abovementioned methods or, if ideas not enforced by problem formulations are involved, directly via an input mask of the problem solution database. In this connection, the suggested solutions can be assessed in the database with regard to their quality.

Said quality assessment can take place, for example, on the basis of the specified motivation points or prize awards for the respective suggested solutions.

BRIEF DESCRIPTION OF THE DRAWINGS

The present invention will be more readily understood from a detailed description of the preferred embodiments taken in conjunction with the following figures:

FIG. 4 shows a diagrammatic view of the operational sequence in accordance with a further aspect of the present invention;

FIG. 5 shows a detailed view of the operational sequence of FIG. 4;

FIG. 6 shows further steps that may follow the final step of FIG. 5;

FIG. 7 shows a diagrammatic view of an operational sequence detail of FIG. 6;

FIG. 8 shows the model A of FIG. 7 in detail;

FIG. 9 shows the model B of FIG. 7 in detail;

DETAILED DESCRIPTION OF THE PREFERRED EMBODIMENTS

Figure 1:
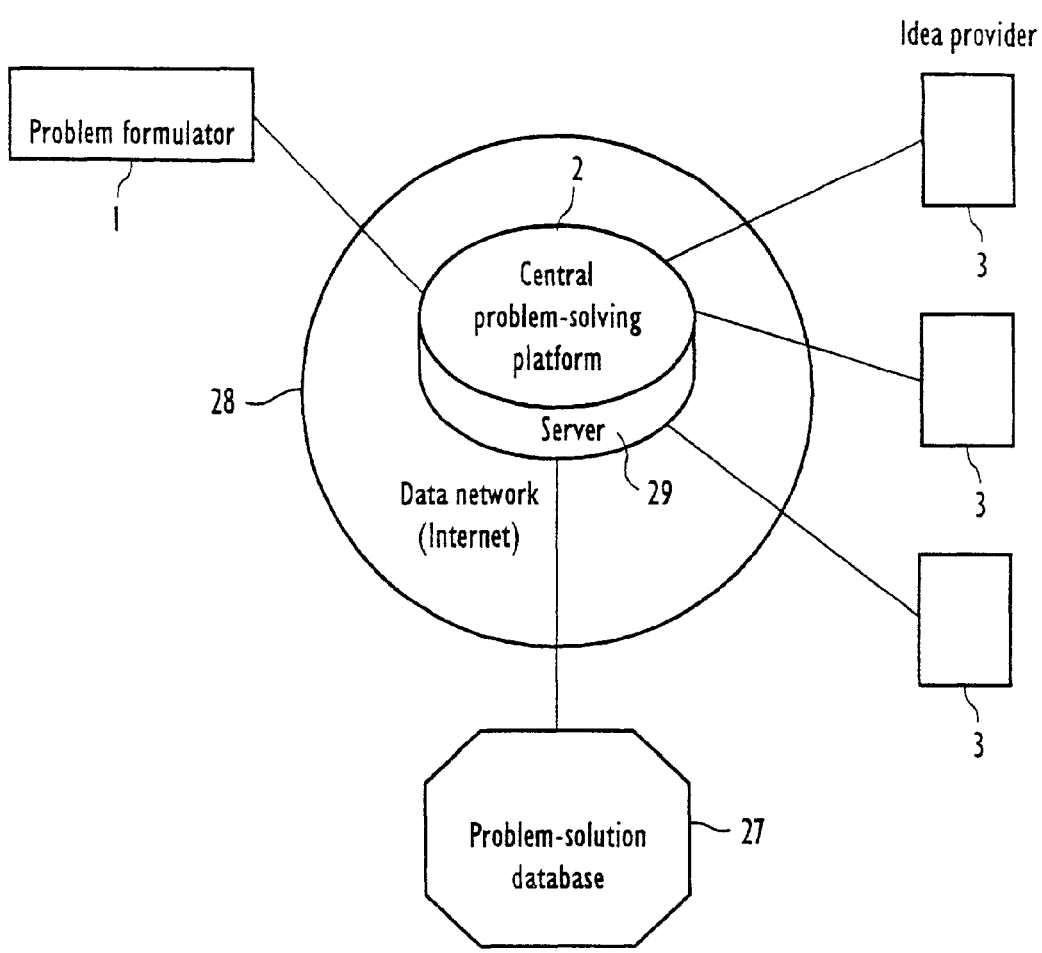
FIG. 1 shows a diagrammatic view of a data network system for performing the present invention.

Referring to FIG. 1, a system for implementing the present invention will now first be explained diagrammatically. Via a data network, such as, for example, the Internet 28, various connected terminals 1, 3 can communicate with a server 29 of the data network. In this connection, a central problem-solving platform 2 in the form of suitable software is installed or implemented on the server 29. The server 29, on which the central problem-solving platform 2 is implemented or installed, can communicate with a problem solution database 27, which may also be part of the server 29 itself. In the exemplary embodiment of FIG. 1, however, the problem-solving database 27 is shown as a separate database that is connected to a data line or to the Internet 28 having the server 29. It may be noted that the problem-solving database will be explained in detail later. In principle, the various terminals 1, 3 are interchangeable in accordance with the idea of the Internet 28, but let it be assumed below that the user of terminal 1 is a so-called problem formulator and users of the terminals 3 are so-called idea providers whose function and actions are explained in greater detail below.

Figure 2:
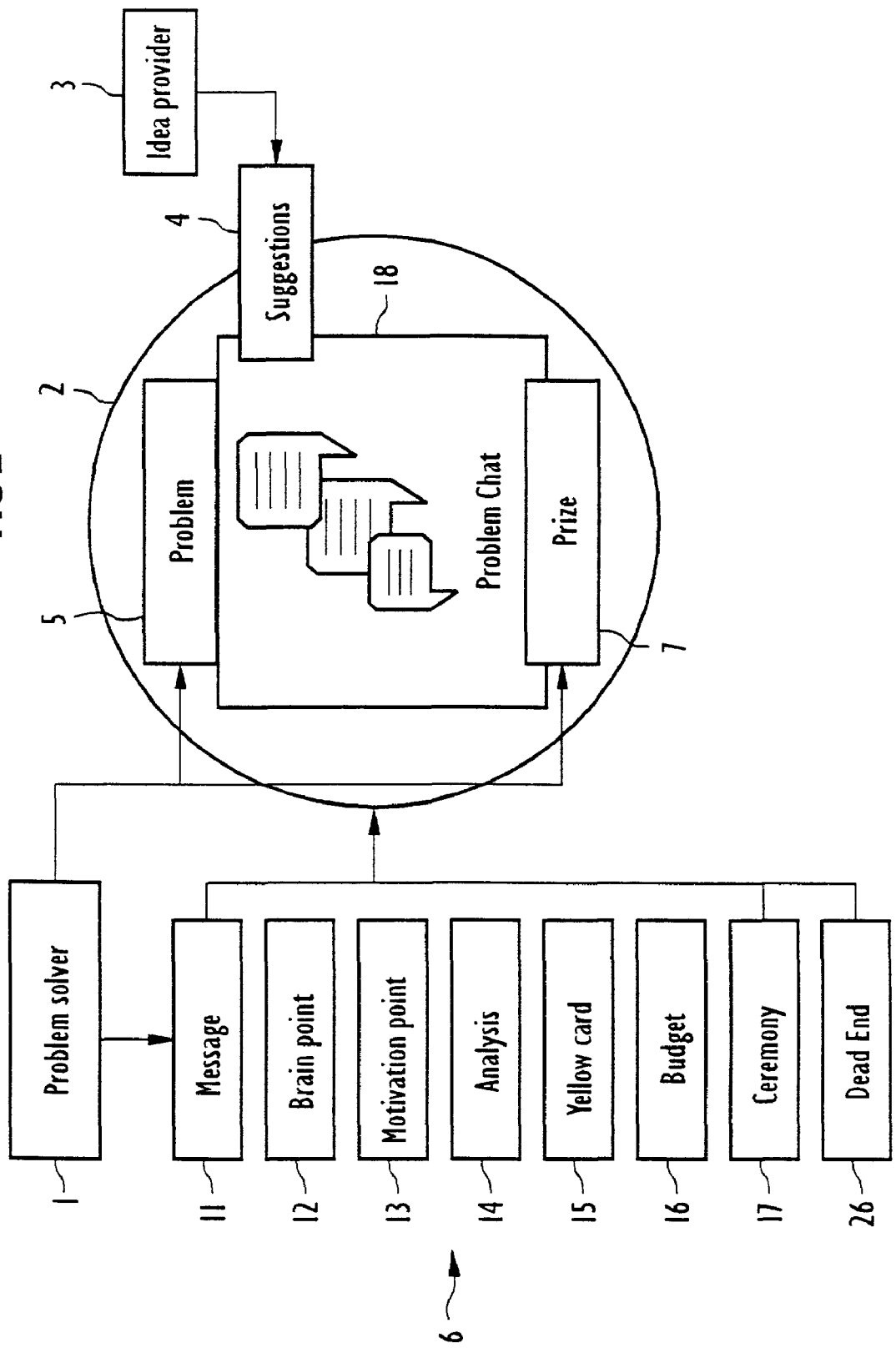
FIG. 2 shows a diagrammatic view of a technique for interactive problem solving according to the present invention.

FIG. 2 shows a detailed function-oriented representation of the system of FIG. 1. The central problem-solving platform 2 on the server 29 makes it possible for the problem formulator 1, i.e., more strictly speaking, the user of terminal 1, to input in text and/or graphical form the description of a problem 5 that is discussed in the course of a BBS (bulletin board system), which is known per se from discussion forums on the Internet. In this context, a BBS is a type of written conversation that can take place in real time, but that makes possible, in addition, a time-shifted (subsequent) contribution into individual, structured conversation threads. It is possible for the participant to latch onto a certain solution path or conversation thread or, alternatively, to open up entirely new conversation threads.

Alternatively or additionally, the problem can be discussed with other participants in the course of a so-called scheduled chat. In this context, a "chat" is a software that makes possible for participants in this service a type of written conversation by means of a (strictly) chronological running text display. Such a chat can be opened up, for example, by the problem formulator. For this purpose, he inputs a deadline into a field provided for the purpose and the other participants then know that they can have a simultaneous discussion at that point in time with the problem formulator in person.

The term "problem chat" is to be understood below as a BBS-type system, possibly supplemented by a scheduled chat.

The problem 5 inputted by the problem formulator 1 can be displayed as text and/or graphically on a surface of the central problem-solving platform 2 so that all the other potential participants in a communication with the central problem-solving platform 2 can read off this problem formulation 5 on their terminal.

Every other user of a connected terminal can assume, possibly after registration, the function of an idea provider 3, which means that he inputs suggested solutions 4 into the central problem-solving platform 2. Said suggested solutions 4 are displayed in text and/or graphical form likewise visibly for all the users on the surface of the central problem-solving platform 2.

As is furthermore evident from FIG. 2, the problem formulator 1 offers a fixed prize 7 before the start of the problem solving, the level of which is also displayed on the surface of the central problem-solving platform 2. In accordance with the invention, in the course of the problem solving, whether the latter is successful in the estimation, for example, of the problem formulator, or is completely unsuccessful or only partially successful, the prize 7 will in any event be handed over to active idea providers of the interactive problem solving.

In relation to the time of allocation and the addressees, the prize distribution is, on the other hand, flexible. The level of the prize or amount of money of a section of the awarding is, however, fixed. This facilitates the operational sequence for all the participants.

The essential point is that control tools 6 are available to the problem formulator 1 for the individual motivated control of the problem solving sequence in accordance with the particular suggestions 4 of the idea providers 3. Said control tools 6 make possible, in particular, a section-by-section individual awarding of the prize 7 offered. The tools "message" 11, "brain-point" 12, "motivation point" 13, "analysis" 14, "yellow card" 15, "budget" 16, "ceremony" 17 and "dead end" 26 are shown as examples of the control tools 6.

The control tools are located on the BBS page. They can also be used in the course of a scheduled chat and appear visually as part of the chat page. Actually, however, the tool field of the BBS page is opened as an additional frame.

Figure 3:
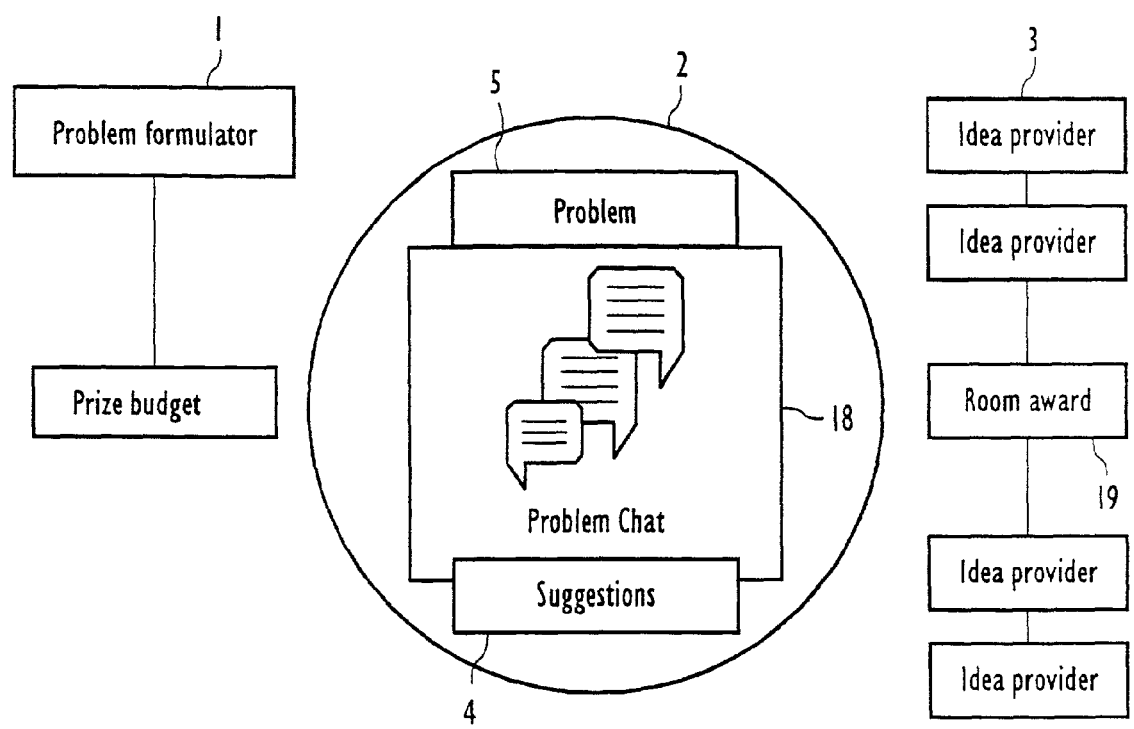
FIG. 3 shows a further tool of the technology in accordance with FIG. 2.

A further type of control tool is the "room-award" function 19 that is shown in FIG. 3 and is used not by the problem formulator 1, but, on the contrary, by the idea providers 3.

The system shown in the diagrammatic FIGS. 1 to 3 are therefore an exclusively digitally managed switching platform on which every data network user can help to solve problems anonymously and earn money prizes or, alternatively, can input his own questions onto the central problem-solving platform and have them solved.

In this connection, the core element is a type of specialism-overarching solution brainstorming in a problem chat 18 installed only for the particular problem formulation and the motivation of the potential idea providers 3 by prize points or motivation points.

The participating groups therefore allow themselves to be divided, on the one hand, into the problem formulators 1 as clients and the problem solvers as idea providers 3.

A client can input a problem formulation into the central problem-solving platform 2 on-line or by e-mail. As stated, in doing so he specifies at the outset a prize 7 for every suggested solution. In a form, for example, credit card data are inputted for this purpose in order to authorize the level of the amount of the prize or the bank link for direct debit collection. The prize is always due regardless of the quality of the suggested solution. A separate problem chat 18, i.e., a BBS and optionally a scheduled chat, is installed for every problem.

The solution participants (also idea providers) 3 interested in prizes can select a topic field on the start page of the central problem-solving platform 2 or, alternatively, input their field of interest by means of a search engine. Accordingly, they then receive a selection of problem descriptions that have already been inputted, with context relating to the chosen topic and a reference (links) to each problem chat 18 installed (BBS page and, optionally, current scheduled chat). In said problem chat 18, comprising the said pages, the idea providers 3 can then participate actively in the current discussion and input suggested solutions 4 in real time.

The distribution of the offered prize 7 to participating idea providers 3 who have acquired points worth money is guaranteed. A transfer of the offered prize always occurs. The problem formulator 1 can observe the problem chat 18 proceeding in each case relating to the problem 5 he has posed and participate actively in the problem solving proceeding in the course of the problem chat 18, in which connection this can take place anonymously via a password or even openly as client. The control tools 6 are made available as tools to the problem formulator 1 for controlling the operational sequence of the problem solving in the problem chat 18. The function of the individual tools 6 will be explained below:

"Message" Tool 11:

The "message" tool 11 permits the formulation of so-called motto lines. The problem formulator 1 can therefore input a motto that can be continuously changed and also makes possible the input of instructions for idea providers 3. To this extent, this is not a control tool in the real sense, but an on-line text input field available to the problem formulator. If the problem formulator 1 does not utilize the functionality of this "rules" tool 11, the two motto lines are occupied in a formulated manner, such as, for example, by "no idea is a bad idea" or "no negative criticism permitted".

"Brain-Point" Tool 12:

The "brain-point" tool 12 permits the awarding of a predetermined share, such as, for example, 5% of the amount of the prize 7 previously offered, for each "brain point" awarded in order obviously to motivate competent idea providers 3. As a result of the fact that, according to the invention, certain shares of the prize 7 are allocated to idea providers 3 in accordance with the allocated brain points in the course of the development of the problem solution in problem chat 18 prior to the concluding solution, the idea providers are always more strongly motivated to develop ideas jointly. In contrast to the prior art, therefore, the entire prize 7 is not allocated to one idea provider 3, but, on the contrary, shares of the prize 7 offered at the outset for the purpose of iterative motivation are allocated section-by-section to guide the problem solving in the problem chat 18.

"Motivation Point" Tool 13:

Without directly claiming the prize 7, the participants can also be motivated by means of the allocation of a "motivation point". The awarding of a "motivation point" does not yet automatically result in the awarding of a certain amount of the money prize 7 to an idea provider 3, but on the contrary, an idea provider 3 first has to accumulate successively a predetermined number, for example 3, of "motivation points" 13 which are then converted automatically into a "brain point" with the corresponding installment of the prize 7. If a "brain point" 12 is assigned to an idea provider 3 before the latter has reached the predetermined number of "motivation points" 13, all the motivation points are erased on the participant account of the relevant idea provider 3. The "motivation point" tool 13 consequently makes possible a flexible control of the problem solving in the problem chat 18 without a confusing variation in value of the brain points having to be permitted.

"Analysis" Tool 14:

Activation and subsequent clicking on a predetermined suggested solution 4 supplied by an idea provider 3 in the current continuous text of the problem chat 18 denotes the beginnings of a solution and consequently requires all the idea providers 3 to concentrate the subsequent problem solving, at least temporarily, i.e., until this function is canceled, on the further development of the selected suggestion. In this case, a corresponding instruction is issued in the message line of the "message" function 11 and a commensurate motivation point is allocated to the idea provider 3 of the selected suggestion 4.

"Dead End" Tool 26:

If a suggested solution 4 is marked in the continuous text of the problem chat 18 by the function "dead end" 26, this means that the problem formulator 1 would like to prevent any further development of the problem solving in the context of this problem proposal 4 blocked in this manner. Consequently, an unnecessary waste of resources is prevented.

"Yellow Card" Tool 15:

Idea providers 3 who have, for example, attracted attention by destructive contributions can be warned by the allocation of a "yellow card" 15, a repeated allocation of a "yellow card" to an idea provider 3 resulting in the banning of the idea provider 3 concerned for the present problem chat 18 in the sense of a red card. Consequently, disruptive idea providers 3 can be excluded from the problem chat 18.

"Budget" Tool 16:

This tool serves to indicate the balance of the prize 7 offered, i.e., that sum still outstanding for awarding after awarding of installments in accordance with the allocated "brain points" 12. Optionally, the prize budget can be topped up again by the problem formulator 1, for example, by a renewed credit card authorization for allocating further "brain points" 12 if the problem formulator 1 is of the opinion that the solution potential has not yet been exhausted after the prize budget 7 offered at the outset has been used up for the first time. The compulsory awarding of the budget sum is specifically programmed in.

"Ceremony" Tool 17:

If the problem formulator 1 arrives at the view that a proposal 4 of an idea provider 3 in the continuous text of the problem chat 18 is a final solution, the prize balance as indicated in the "budget" tool 16 can be immediately allocated by actuating the "ceremony" tool 17. The problem chat 18 concerned relating to said problem 5 is then closed. This function ensures a high attractiveness for, and motivation of, idea providers 3 still participating right up to the conclusion.

A certain share, for example 30%, of the total prize budget is set aside and retained for the purpose of exercising the "ceremony" function. Consequently, said share is not available for distribution via the "brain point" function.

The idea providers 3 can place their proposals 4 on the appropriate page of the problem chat 18 via a text input field and supplement it with drawings via a so-called whiteboard. The function of the whiteboard is, by the way, explained in detail below.

The idea providers 3 furthermore each find the "room award" control tool 19 (in FIG. 3) in a tool bar assigned to them. A certain percentage of the prize sum 7, for example 10%, is compulsorily allocated to the "room" function 19. This type of prize awarding is allocated by the idea providers 3 by awarding commensurate room award points to the solution contribution of the respective other idea providers 3 that is the most creative in their view. In this connection, each idea provider 3 has only one room award available for awarding, but it can be assigned to other idea providers 3 as desired right up to the conclusion of the problem chat 18. This makes it possible, inter alia, for the problem formulator 1 to gain an insight into the assessment of the different suggested solutions 4 in the view of the idea providers 3. If a problem formulator 1 has not made any decision about the awarding of the prize 7 right up to the conclusion of the problem chat 18, the outstanding total sum in accordance with the "budget" function 16, including the ceremony share 17, is automatically allocated to the idea provider 3 having the most room award points 19.

The programmed distribution key as to how the total prize budget is divided up over brain point/motivation/room award/ceremony cannot be influenced by the problem formulator. Said distribution key splits the total amount specified by the problem formulator into several parts based on a different awarding mechanism in each case as explained above.

The system shown in FIGS. 1 to 3 therefore provides a motivation-point and prize-controlled problem chat 18 that makes possible an interactive problem solving.

Referring to FIGS. 4 to 9, a further exemplary embodiment of the present invention will now be explained. Whereas the exemplary embodiment of FIGS. 1 to 3 is intended for the public sector, the exemplary embodiment of FIGS. 4 to 9 serves the professional sector, in which, for example, companies 21 would like to solve certain problem areas. The connection with the exemplary embodiment of FIGS. 1 to 3 is that certain solution providers 3 from the exemplary embodiment of FIGS. 1 to 3 can qualify as so-called "top brains" if they have attracted attention by their special authority expressed, for example, in room award points.

This model in accordance with FIGS. 4 to 9 is attractive in that the companies 21 have a privileged access to the creativity of the "top brains" of the lower level. The companies 21 are provided for this purpose with an exclusive selection tool 30 for selecting reliable idea providers 3. In addition to an authority search function, the companies 21 consequently have an insight into a ranking that may result from the operational sequence in accordance with the exemplary embodiment of FIGS. 1 to 3 and can put together an anonymous profile of "top brains". However, the creative behavior of such solution providers 3 can be traced right back into the complete contributions of problem chats 18 already concluded.

Selected idea providers 3 may consequently then be invited as "top brains" for participating in the problem solving in the higher level.

The profile relating to the selection of the "top brains" among the solution providers may, for example, contain the following details:
Ranking position
Brain points and motivation points according to number, total value and relationship to participation frequency;
Brain points broken down according to the topic of the problem formulation; and
Details about the share in solutions of problems posed by institutions and companies, etc.

The method shown in FIG. 4 can consequently also be utilized to incorporate top brains permanently into a competent authority pool 20 of the upper level.

Referring to FIG. 5, the operational sequence of problem solving in accordance with this exemplary embodiment is now explained. In a preliminary round, the client (company) 21 selects the participants according to an anonymous competence profile and negotiates with them an individual daily rate as basic reimbursement, or he agrees to the daily rate specified in the personal profile. The client 21 has the option of replacing participants of the competent authorities 20 at any time or varying their participant numbers. In this procedure, the client 21 can optionally appear openly or anonymously. In addition, the client 21 defines the problem 34. In this prize-free preliminary round 31, the problem is precisely defined in a first brainstorming 35. At the same time, the competent authorities 20 have the opportunity of conveying to the client 21 their fields of suitability in order to build up in this way in the continuing value of their solution approaches that follow in the subsequent negotiation levels 32 and 33.

The group brainstorming levels 32 then follow as the next step. The client 21 can terminate the prize-free preliminary round 31 and then open up the next group brainstorming level 32. In this connection, the control tools 6 in accordance with the exemplary embodiment of FIGS. 1 to 3 are available to him. In addition, the operational sequence is extended by specific communication structures in the sense of a professional brainstorming.

As idea providers, the competent authorities 20 formulate a solution approach, place it in a concealed manner on the platform and specify the number of brain points the client 21 has to expend on the opening operation. At the same time, they openly mark in a specified button whether, in their view, a novelty or, alternatively, a reference to existing know-how is involved. The client 21 is able to open the concealed offer 36 at any desired instant in time, an automatic credit being made in the course of the opening to the account of the competent authority 20 involved. Furthermore, the client 21 can optionally disclose the platform contribution without a further credit becoming due as a result for the competent authority 20. The client 21 may, however, also actuate the protest function 37. A short input field is then opened in which the client 21 has to give reasons for the protest. This has the effect that the protest is communicated to the competent authority 20 as idea provider and the latter can withdraw his offer 36 concerned. If the competent authority 20 does not withdraw his concealed offer 36, the protest 37 is disclosed to the other competent authorities 20 and the latter are invited to vote 38. If the protest is accepted with a ⅔ majority, the competent authority 20 concerned may retain the credit, but receives a negative point in the anonymous profile. Alternatively, he can waive the credit and does not receive a negative point.

At any desired point in time, the client 21 can open up the bilateral negotiation level 33 in the "negotiation room" 39. At this bilateral negotiation level 33 in the negotiation room 39, a bilateral communication arises between a selected competent authority 20 who has qualified in the group brainstorming level 32 with the client 21. Said bilateral negotiation level includes, in the first stage, the disclosure of the identities 40 of the participating parties comprising client 21 and competent authority 20, respectively. For the client 21, this is an assessment aid in the case of high-quality solutions and a commensurate reimbursement. The objective of the second stage is to find an acceptable bilateral reimbursement mechanism 41 for both sides. In this connection, the idea provider selected from the competent authorities 20 divides up a final solution draft into several fields, for example three to nine fields and places them in concealed form on the server 28. Furthermore, he specifies a value requirement for 100% of the solution. Finally, he specifies a progressive price function (for example, a hyperbola) specified in the database for the individual prices of the fields. The client 21 can negotiate about the value requirement, and his counter-offer is displayed in turn as a table in accordance with the price function. When agreement is reached, the problem formulator is automatically required to make a 100% credit card authorization. The individual fields can be opened by the problem formulator on payment of the reported values. A reimbursement is made in each case to the account of the idea provider.

Referring to FIGS. 7 to 9, various models are now revealed for the description of the solution and the disclosure in individual sections. In the case of model A in accordance with FIG. 8, the transfer takes place in logically structured sections, the sections being offered as fields in a concealed manner in a logical sequence. In this connection, field 1 is the most inexpensive field, but the last field contains the key to the solution and is the most expensive field.

Model B in accordance with FIG. 9 is a sale of the fields of the solution description with randomly mixed elements. The idea provider 3 divides up the draft solution into several elements. These elements are mixed in a random generator in the database and distributed over the corresponding number of fields. Even the idea provider does not now know the specific field contents. The client can uncover field after field in any desired sequence, the first disclosure being the most expensive field and the last field being the least expensive.

Figure 10:
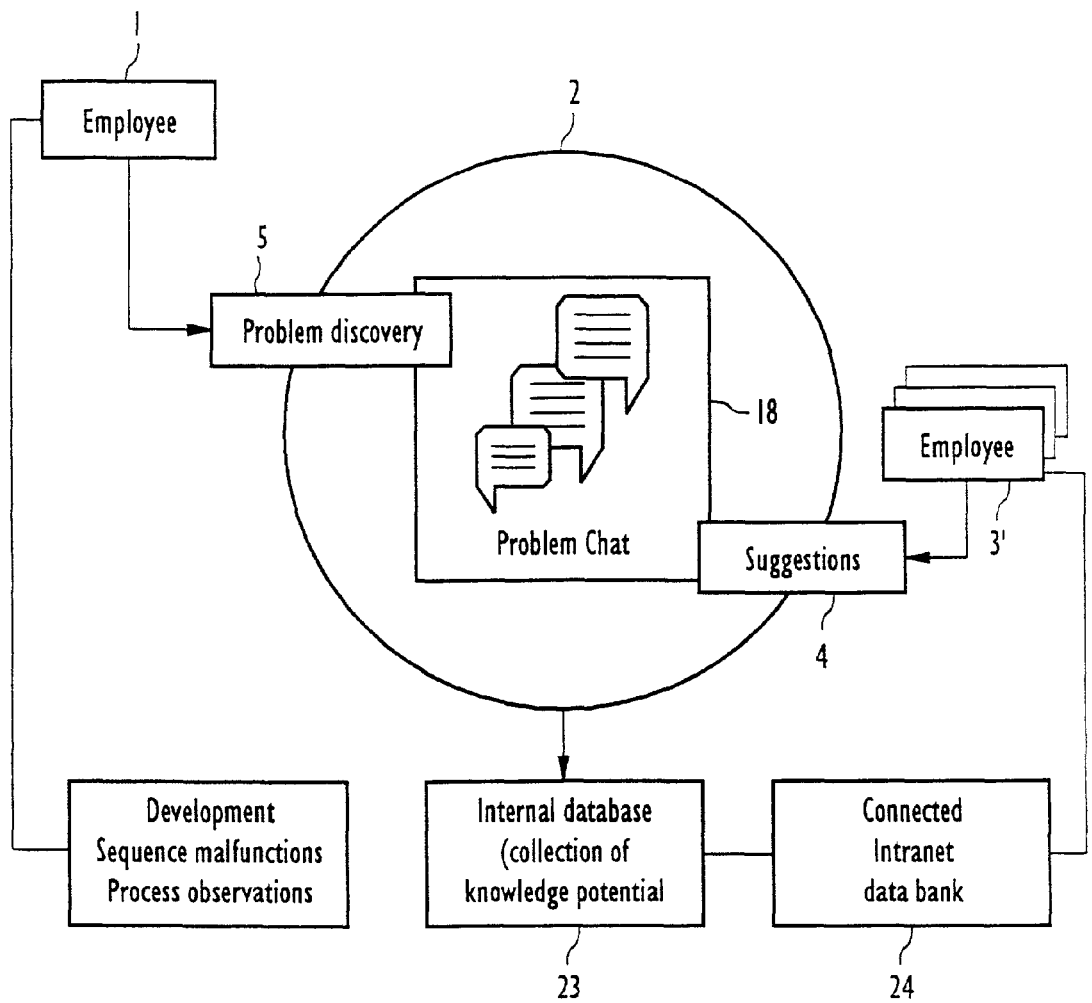
FIG. 10 shows a further exemplary embodiment of the present invention in which an interactive problem solving takes place in a company Intranet.
Figure 11:
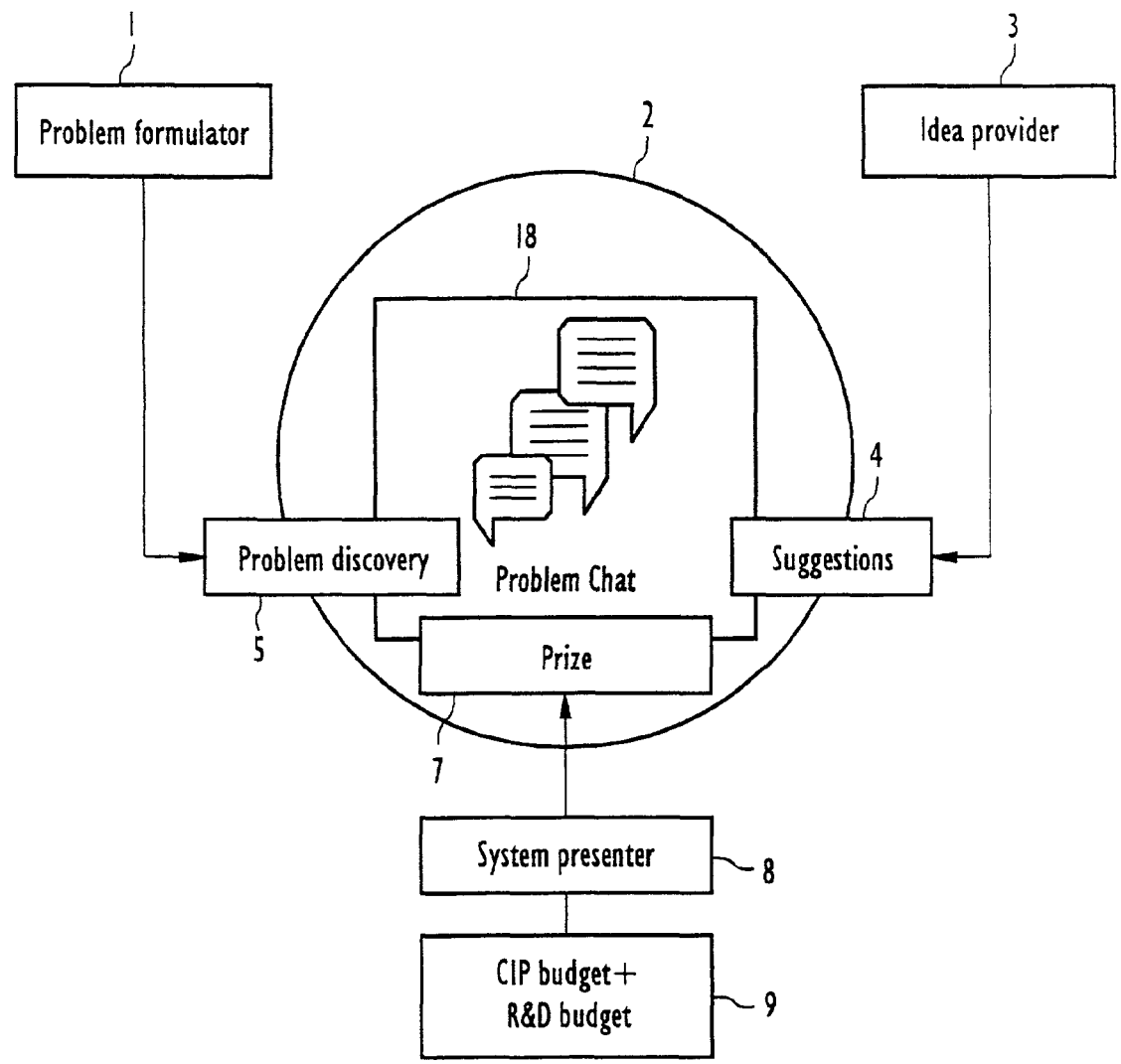
FIG. 11 shows the operation of a system presenter in the system of FIG. 10.
Figure 12:
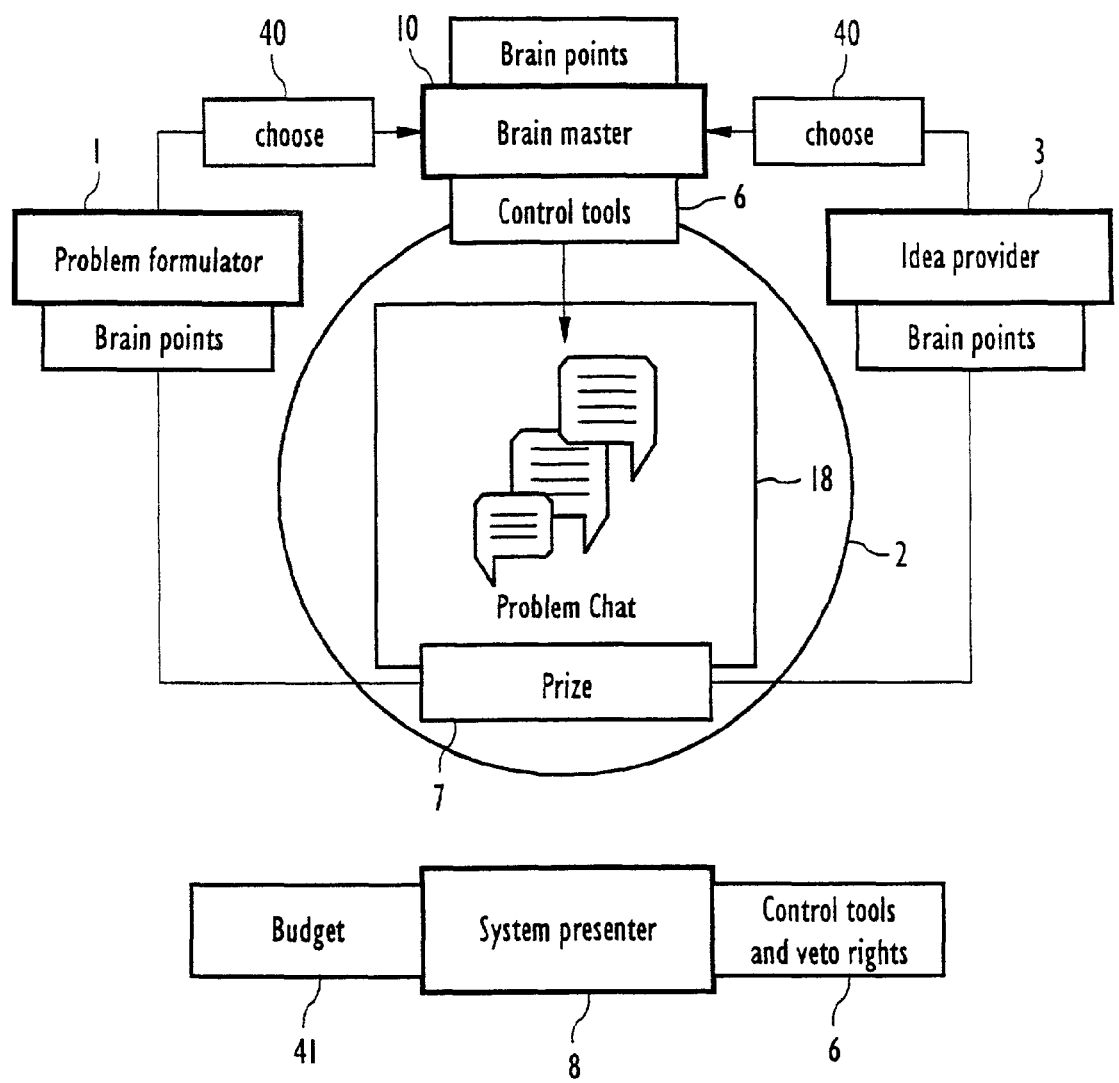
FIG. 12 shows further operational sequences that may take place in connection with the system of FIG. 11.

Referring to FIGS. 10 to 12, a further exemplary embodiment of the present invention that can be summarized as an internal company electronic brainstorming will now be explained. The field of application of this exemplary embodiment is, for example, the implementation of continuous improvement processes (CIP) and of the company suggestion system (CSS). This exemplary embodiment can therefore serve, in particular, as a creativity tool for the research and development, and innovation and development sectors in the context of an Intranet application in a company. It can activate knowledge resources of employees and internal data files. Said resources can then be further improved by a subsequent brainstorming in the sense of a problem chat 18.

Important in this connection is an interdisciplinary focusing and incorporation of the competence of an employee for individual tasks. At the same time, the knowledge acquired that has been standardized as knowledge potential for the future is stored in a database 23.

As is evident from FIG. 10, an employee 1 of a company who has encountered a problem in the company as a result of development, sequence faults or process observation can place the finding of said problem 5 in the central problem-solving platform 2. At the same time, other employees 3' of the same company can input suggestions 4 on the central problem-solving platform by means of the problem chat 18 that has been opened for this problem discovery 5. In this connection, for example, an Intranet database 24 that is connected and contains knowledge already available in the company can be utilized by the employees 3'. At the same time, the new suggestions 4 are stored in a standardized manner in an Intranet database 23 for collecting knowledge potential.

As is evident from FIG. 11, this system is based on an incentive system, i.e., prizes 7 may be awarded for problem recognition and suggested solutions, and prizes may also be awarded for pure improvement suggestions. The presentation is carried out in this connection by a system presenter 8 appointed by the company who has a CIP budget and a research and development budget 9. The system presenter 8 opens up a problem chat 18 for a particular problem discovery 5 and at the same time specifies the level of the prize 7.

Various control tools are also available for said exemplary embodiment in accordance with FIGS. 10 to 12.

New in this connection is the tool 40 for choosing a so-called brainmaster 10. Like other control tools, this one is initially available only to the system presenter 8. The latter can assume the brainmaster function 10 himself, specify a brainmaster 10 or, alternatively, activate the "brainmaster choice" control tool 40.

In accordance with the "brainmaster choice" tool 40, the participants (problem formulator 1, idea provider 3 or system presenter 8) award brainmaster points to the participant who has the greatest assessment competence in their opinion. After a brainmaster 10 has been chosen, the control tools 6 are also passed to the brainmaster 10. Right of veto is, however, available to the system presenter 8.

The "budget" control tool 41 is exclusively available to the system presenter 8 as responsible manager of the company and serves to increase the budget.

In contrast to the exemplary embodiments of FIGS. 1 to 3, in this present exemplary embodiment, the control tools 6 are first available to the system presenter 8 before they are transferred to the brainmaster 10 after he has been chosen. As a rule, the control tools 6 are consequently not at the disposal of the problem formulator 1.

The problem description and also the description of the suggested solutions can be supplemented on-line on a so-called "whiteboard" graphically or by means of e-mail transmitted photos etc. Alternatively, the user can select data files stored on his own hard disk and these can then be transferred to the "whiteboard" on the central platform. They can then be formatted together with the description text of the problem formulation or the suggested solutions automatically into an image of low resolution, stored in the central computer/server and a reference (link) can be generated automatically in the text of the suggested solution for viewing the graphics produced with the "whiteboard".

In this connection, the vector-based whiteboard does not require as an interactive on-line option either the active downloading on the part of the participants, nor is it directly executed under software control in the user's computer, but it is executed in the server itself. As server-based system, it is accessible to all the participants and can be executed at a high speed.

The graphical representation of the problem description can ideally be viewed on-line by all the other participants. As a simpler solution, provision may be made that the participants employ the last updated version of the graphical representation, which is transferred to the central platform only when a certain button has been actuated.

The technique according to the invention can also be used to build up a problem-solving database 27. Creative inputs to problem descriptions and solution descriptions and also ideas inputted without invitation are stored in said database 27. In this connection, the problem-description and solution-description contributions are supplemented with a quality filter as a result of assessment by the visitor: every visitor is able to assess the problem-description and solution-description suggestions viewed, the assessment average then being displayed alongside the contribution content information. In addition, a quality assessment may take place on the basis of the motivation points awarded as prizes for the suggested solutions concerned.

The visitor assessment is inputted in digital form and directly influences the categorization of the idea in the ideas rank that is then offered to subsequent visitors after inputting a key word. In the case of a below-average assessment, this digital quality filter may result in an automatic exclusion of the contribution from the area of the database accessible to the visitors. The visit to the database may be subject to cost. Part of the flat cost charge is then transferred to those idea providers whose inputs were viewed by the paying visitor. The uninvited input of ideas, i.e., the input that is not transferred automatically by the database program from the central problem-solving platform may be associated with a compulsory payment. This fixed compulsory amount is refunded or credited as soon as the contribution has acquired a certain ranking status. This has the effect of an upstream quality filter.

Figure 13:
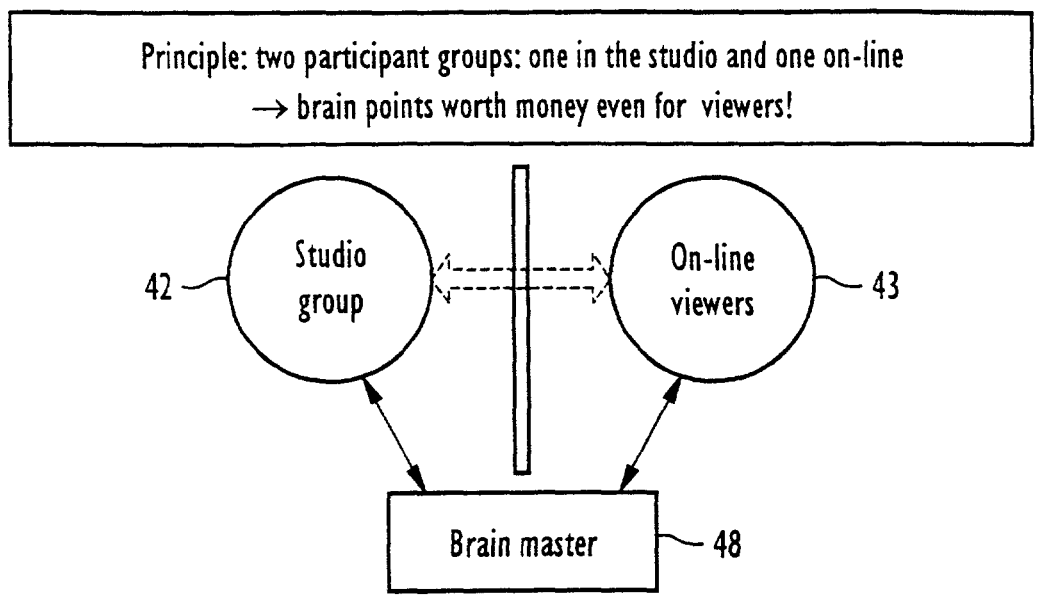
FIG. 13 shows the application of the present invention to a TV format, namely an interactive quiz show.

The concept of the present invention is likewise suitable for application to a TV format that interactively links a data network (Internet) with TV broadcasts. More strictly speaking, said TV format is intended to constitute problem solving by interactive linking of television and Internet. As is evident from FIG. 13, there are basically two groups of participants, namely a studio group 42 situated in a television studio and the viewer group 43 that can communicate with the studio group 42 on-line. Furthermore, a brainmaster 48 (presenter) is provided who can influence the problem-solving sequence by means of control tools. It is important in this connection that, as a result of awarding commensurate brain points to members of the viewer group 43, prizes worth money can also be distributed to the viewers.

In such a concept, the problem may occur that the on-line chat can result in technical problems as a result of the online connection of the viewer group 43 to the studio group 42 in the event of commensurate popularity of the broadcast if too many participants in the viewer group 43 have to be looked after. On the other hand, the number of potential participants in the viewer group 43 should not be artificially limited since this broadcasting format could consequently be robbed of its appeal.

Figure 14:
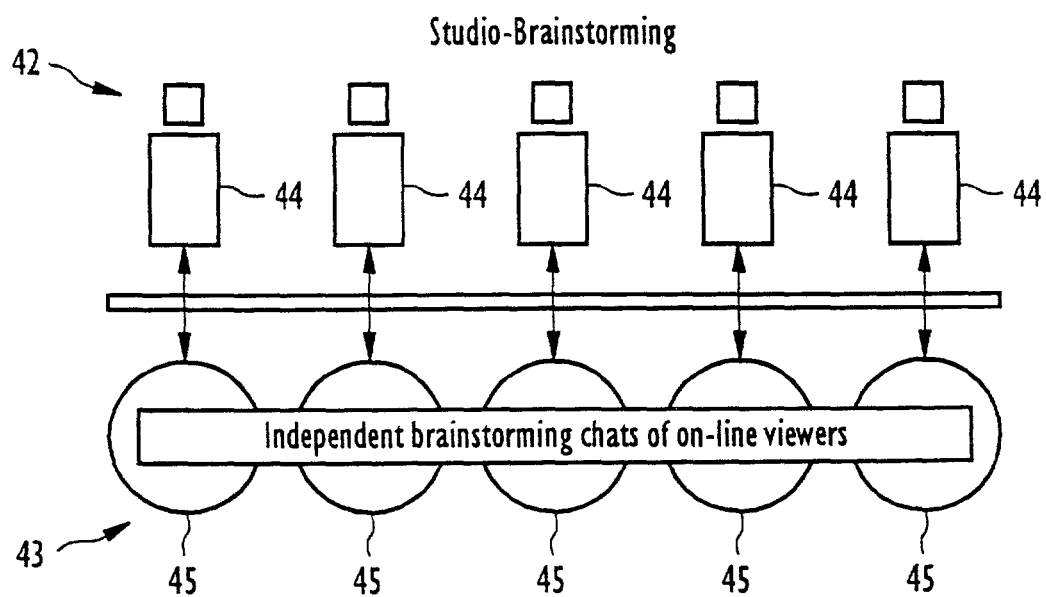
FIG. 14 shows a detailed view of the TV format in accordance with FIG. 13.

FIG. 14 shows one possibility of how the technical problem can be handled. In accordance with the concept of FIG. 14, a separate "chat room" 45 is assigned to every member 44 of the studio group 42. The viewer group 43 is consequently subdivided into different chat rooms 45 whose number depends on the number of members in the studio group 42. Consequently, the viewer contributions can be "channeled" out of the rows of the viewer group 43. Every studio participant 44 in the studio group 42 has, as shown, a separate chat room 45 for which the broadcaster makes available to him a certain prize budget. The assigned participant 44 in the studio may present suggestions from the respective chat group 45 assigned to him as his own suggestions. Consequently, an interesting identification results between members of the viewer group 43 and their "favorite" in the studio group 42. If, namely, that participant in the studio group 42 "wins" by acquiring a commensurate number of brain points, a budget increase to the same extent by the broadcaster may take place for an equivalent prize award on the part of the actual idea provider, namely of the respective participant in the chat room 45 who is assigned to said participant in the studio group 42.

Of course, members of the viewer group 43 may hop freely between the various chat rooms 45. Consequently, every studio participant 44/chat room 45 unit is ultimately a separate system, as is shown, for example, in FIGS. 1 to 3. Ultimately, the system in accordance with FIGS. 1 to 3 is converted to the television level.

As a modification, it is possible that the members of the studio group do not receive a prize budget for the chat room they look after. A budget, including the associated control tool, is only available to the brainmaster or studio presenter. Members of the studio group distribute brain points in accordance with the system to the on-line chat participants. Said brain points denote an obligatory claim for the case where the member of the studio group looking after the chat receives a brain point worth money from the TV presenter. Without the TV presenter having any influence, the same sum is automatically made available as (retrospectively available) budget sum for the chat room looked after, which sum increases correspondingly with every additional brain point. The budget of the TV presenter is accordingly divided into two equal parts: 100% allocation to the studio group means allocation of a 200% budget. The purpose of this awarding mechanism is that the brain points, etc., of the on-line chat participants can only be converted into money if the studio member supported by them in the studio also acquires brain points. The result is a stronger identification of the on-line chat participants with their "favorite" in the TV studio and consequently a certain guarantee that the chat participants actually participate right up to the end of the broadcast in order to support their favorite actively.

The function of the brainmaster 48 will be presented below:

The function of the brainmaster 48 is to some extent comparable with the function of the system presenter 8 in accordance with FIG. 12. In the television studio, therefore, the broadcast presenter is at the same time brainmaster 48 and uses the control tools that have already been explained with reference to FIGS. 1 to 3 with respect to the participants in the studio group 42. The viewers can likewise be motivated by awarding brain points. Consequently, the special appeal of this concept is that viewers can also acquire brain points worth money.

Figure 15:
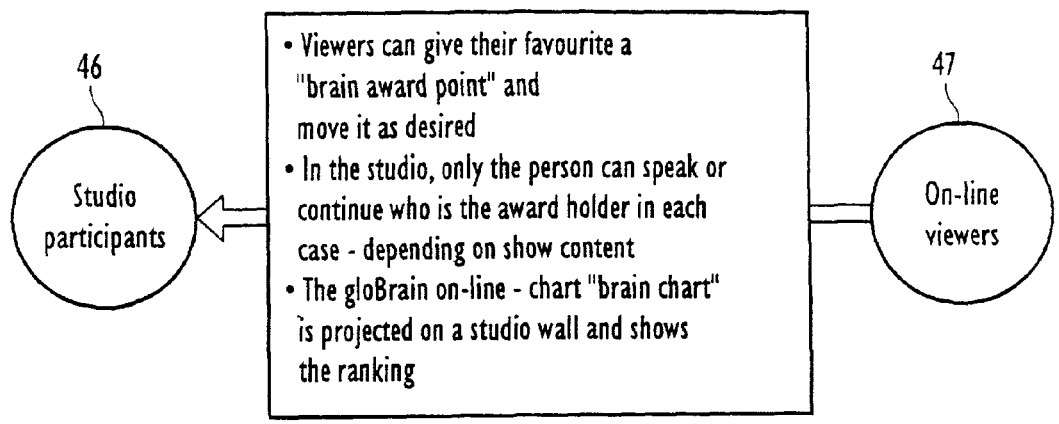
FIG. 15 shows a further example of the application of the present invention to a TV format.

Referring to FIG. 15, a modification of the TV format will now be explained.

In accordance with this concept, the room award function, which has already been explained under reference symbol 19 with reference to FIG. 3 is offered in isolation and is matched to the television format. Said "room award" tool isolated in this way makes possible a quota-oriented broadcast control by the viewer. As a result of isolating the tool, the viewer is no longer overtaxed by a multiplicity of control tools. Consequently, this system can be incorporated into the existing formats (discussion circles, reality TV shows, comedies).

As is evident from FIG. 15, in the case of the isolated application of the "room award" control tool, participants in the viewer group 47 can give their favorite participant in the studio participant group 46 a brain award point and this can be moved as desired between the various members of the studio participant group 46. Only that member of the studio participant group 46 who is the award holder at the time has the right to speak. Consequently, therefore, it is not members of the on-line participant group 47 who acquire award points, but members of the studio participant group 46. The right to speak is therefore coupled to the brain award point. In this connection, only members of the on-line viewer group 47 who are actually on-line can award points and, as soon as a member of the on-line viewer group 47 enters the off-line state, his award that may already have been allocated lapses.

Figure 16:
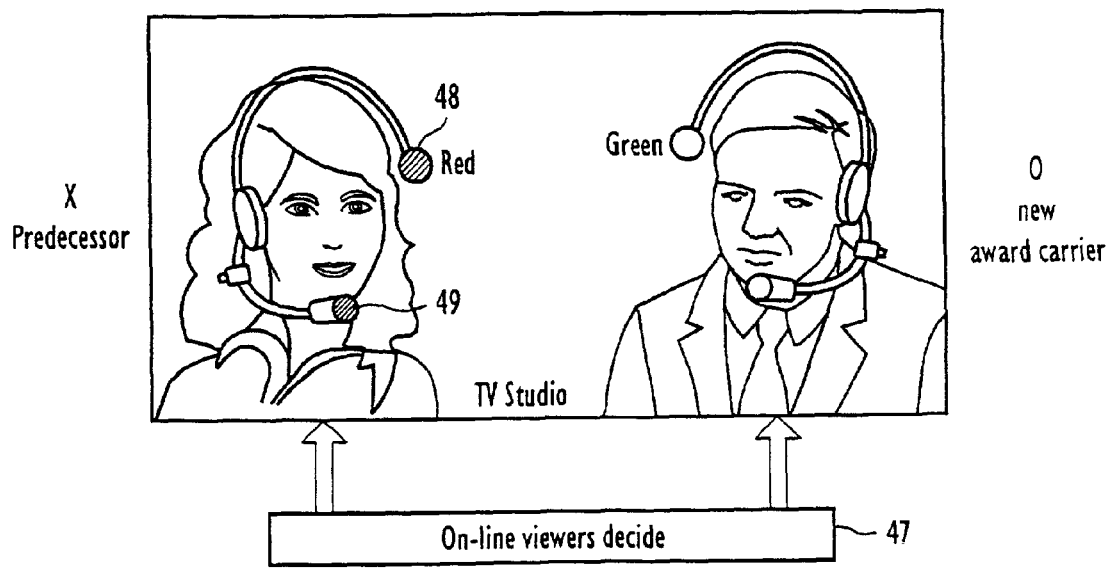
FIG. 16 shows yet a further example of the application of the present invention to a TV format.

FIG. 16 shows a further possibility of applying the concept of the present invention to a TV format. According to this concept, every studio guest has a microphone clip (or headpiece) 49 on his head to whose upper end a small indicator unit (light bulb) 48 is attached. The light bulb of the current award holder lights up, for example, in green, which denotes at the same time the enabling of his microphone 49. As soon as another participant takes over the "leadership" by acquiring commensurate points, the color of the indicator unit 48 changes, for example, to red and the microphone 49 of the "red" participant is disabled.

While the invention has been particularly shown and described with respect to preferred embodiments thereof, it will be understood by those skilled in the art that changes in form and details may be made therein without departing from the scope and spirit of the invention.

What is claimed is:

1. A server on a network, the server operable to:
   receive from a first participant via the network a formulation of a problem to be solved;
   receive from a plurality of other participants via the network at least non-final suggested solutions to the problem; and
   distribute portions of an award to those participants who contribute the at least non-final suggested solutions to the problem,
   wherein the server is configured to distribute a portion of the award, before it has been determined that the problem has been solved, to at least one participant who contributed the at least non-final suggested solution to the problem,
   wherein the server provides control tools for use by the first participant for controlling the distribution of the portion of the award to the other participants and
   wherein the distributions of the portions of the award are varied over the course of a development of the suggested solutions for the purpose of guiding the development of a final solution to the problem.

2. A server according to claim 1, further operable to:
   manage a discussion of the problem and the suggested solutions; and
   receive and display the discussion in real time.

3. A server according to claim 1, further operable to:
   receive anonymously the formulation of the problem and the suggested solutions.

4. A server according to claim 1, further operable to:
   communicatively couple to a database adapted to store the formulation of the problem and suggested solutions.

5. A server according to claim 1, further operable to:
   store other tools for use by the other participants for controlling the distribution of the portions of the award among themselves.

6. A server according to claim 1, wherein if the first participant has not awarded all of the portions of the award to the other participants within a predetermined time, at least some of the remaining portions of the award are automatically distributed to the other participant who has received within the predetermined time the largest fraction of the award.

7. A server according to claim 1, further operable to:
   store tools for use by a presenter for controlling the award to the other participants, wherein the distribution of the portions of the award is varied over the course of a development of the suggested solutions for the purpose of guiding the development of a final solution to the problem.

8. A server according to claim 7, wherein the other participants are viewers of a television broadcast relating to the formulation of the problem and the suggested solutions and the presenter is a television presenter for the television broadcast.

9. A server according to claim 7, where the presenter is selected by the other participants.

10. A server according to claim 1, wherein the other participants are anonymous.

11. A server according to claim 1, the tools further adapted to block the further development of a selected suggested solution.

12. A server according to claim 1, the tools further adapted to allow the first participant to select one of the suggested solutions and control the discussion and distribution of the portions of the award in the context of the selected suggested solution.

13. A server according to claim 1, wherein the formulation of the problem is related to the improvement of company processes.

14. A server according to claim 1, further operable to:
receive a selection of at least one competent authority from the other participants on the basis of suggested solutions delivered by the at least one competent authority via the network; and
facilitate a private problem resolution discussion between a client and the selected at least one competent authority.

15. A server according to claim 14, wherein the client is the first participant.

16. A server according to claim 14, wherein the first participant is an employee of the client.

17. A server according to claim 14, wherein the at least one competent authority is preselected before the formulation of the problem is received by the server.

18. A server according to claim 14, further operable to:
provide a negotiation forum for the at least one competent authority and the client to negotiate a level of award to be awarded to the at least one competent authority for the suggested solution.

19. A server according to claim 2, further operable to thread the discussions.

20. A server according to claim 1, wherein the first participant authorizes the level of the amount of each portion of the award before the other participants send the suggested solutions, thereby finalizing the distribution of the portions of the award.

21. An apparatus for facilitating problem solving on a network, comprising:
means for transmitting and receiving from a first participant via the network a formulation of a problem to be solved;
means for transmitting and receiving from a plurality of other participants via the network at least non-final suggested solutions to the problem;
means for distributing portions of an award to those participants who contribute the at least non-final suggested solutions to the problem; and
means for controlling the distribution of the portions of the award including means for distributing a portion of the award, before it has been determined that the problem has been solved, to at least one participant who contributed the at least non-final suggested solution to the problem; and
means for controlling the portion of the award to the other participants, wherein the distribution of the portions of the award is varied over the course of a development of the suggested solutions for the purpose of guiding the development of a final solution to the problem.

22. An apparatus according to claim 21, further comprising:
means for managing a discussion of the problem and the suggested solutions in real time;
means for accepting input of data relating to the discussion; and
means for placing the data onto the network.

23. An apparatus according to claim 21, further comprising:
means for transmitting anonymously onto the network the formulation of the problem and the suggested solutions to the server; and
means for receiving the anonymous formulation of the problem and the suggested solutions from the network.

24. An apparatus according to claim 21, further comprising:
means for storing the formulation of the problem and the suggested solutions.

25. An apparatus according to claim 21, further comprising:
means for storing other tools for use by the other participants for controlling the distribution of the portions of the award among themselves; and
means for displaying and receiving off of the network a selection of the other tools.

26. An apparatus according to claim 21, further comprising:
means for receiving a selection of at least one competent authority from the other participants on the basis of the suggested solutions delivered by the at least one competent authority via the network;
means for accepting the selection from the other participants; and
means for facilitating a private problem resolution discussion between a client and the selected at least one competent authority.

27. An apparatus according to claim 26, further comprising:
means for providing a negotiation forum for the at least one competent authority and the client to negotiate a level of award to be awarded to the at least one competent authority for the suggested solution; and
means for providing a forum for the negotiation.

28. An apparatus according to claim 22, further comprising:
means for threading the discussions.

29. An apparatus according to claim 21, further comprising:
means for authorizing the level of the amount of each portion of the award before the other participants send onto the network the suggested solutions.

30. A method of facilitating problem solving over a network, comprising the steps of:
transmitting to a server via the network a formulation of a problem from a first participant;
receiving at the server via the network from a plurality of other participants at least non-final suggested solutions to the problem;
distributing from the server via the network portions of an award to those participants who contribute the at least non-final suggested solutions to the problem; and
controlling at the server with tools the distribution of the portions of the award to distribute a portion of the award, before it has been determined that the problem has been solved, to at least one participant who contributed the at least non-final suggested solution to the problem; and
controlling the award to the other participants, wherein the distribution of the portions of the award is varied over the course of a development of the suggested solutions for the purpose of guiding the development of a final solution to the problem.

31. A method according to claim 30, further comprising the step of:
varying the distributions of the portions of the award over the course of a development of the suggested solutions for the purpose of guiding the development of a final solution to the problem.

32. A method according to claim 30, further comprising the step of:
managing a discussion of the problem and the suggested solutions in real time.

33. A method according to claim 30, wherein
transmitting anonymously onto the network the formulation of the problem and the suggested solutions to the server; and
receiving the anonymous formulation of the problem and the suggested solutions from the network.

34. A method according to claim 30, further comprising the step of:
storing the formulation of the problem and the suggested solutions.

35. A method according to claim 30, further comprising the steps of
storing other tools for use by the other participants for controlling the distribution of the portions of the award among themselves; and
displaying and receiving off of the network selection of the other tools.

36. A method according to claim 30, wherein if the first participant has not awarded all of the portions of the award to the other participants within a predetermined time, automatically distributing at least some of the remaining portions of the award are to the other participant who has received within the predetermined time the largest fraction of the award.

37. A method according to claim 30, further comprising the steps of:
storing tools for use by a presenter for controlling the award to the other participants; and
varying over the course of a development of the suggested solutions the distribution of the portions of the award for the purpose of guiding the development of a final solution to the problem.

38. A method according to claim 37, further comprising the step of: selecting the presenter by polling the other participants.

39. A method according to claim 30, further comprising the step of:
blocking the further development of a selected suggested solution using one of the tools.

40. A method according to claim 30, further comprising the steps of:
selecting one of the suggested solutions; and
controlling the discussion and distribution of the portions of the award in the context of the selected suggested solution.

41. A method according to claim 30, further comprising the steps of:
transmitting and receiving a selection of at least one competent authority from the other participants on the basis of the suggested solutions delivered by the at least one competent authority via the network; and
facilitating a private problem resolution discussion between a client and the selected at least one competent authority.

42. A method according to claim 41, wherein the client is the first participant.

43. A method according to claim 41 wherein the first participant is an employee of the client.

44. A method according to claim 41, further comprising the step of:
preselecting the at least one competent authority before the formulation of the problem is received by the server.

45. A method according to claim 41, further comprising the step of:
providing a negotiation forum for the at least one competent authority and the client to negotiate a level of award to be awarded to the at least one competent authority for the suggested solution.

46. A method according to claim 32, further comprising the step of:
threading the discussions.

47. A method according to claim 30, further comprising the step of:
authorizing the level of the amount of each portion of the award before the other participants send the suggested solutions, thereby finalizing the distribution of the portions of the award.

48. A server according to claim 4, further operable to:
receive from at least one visitor a quality assessment of the suggested solutions.

49. A server according to claim 4, further operable to:
determine a quality assessment based on the portions of the award received for the respective suggested solutions.

50. An apparatus according to claim 21, further comprising:
means for receiving from at least one visitor a quality assessment of the suggested solutions.

51. An apparatus according to claim 21, further operable to:
means for determining a quality assessment based on the portions of the award received for the respective suggested solutions.

52. A method according to claim 30, further comprising the step of:
receiving from at least one visitor a quality assessment of the suggested solutions.

53. A method according to claim 30, further comprising the step of:
determining a quality assessment based on the portions of the award received for the respective suggested solutions.

* * * * *